Figure 1A:
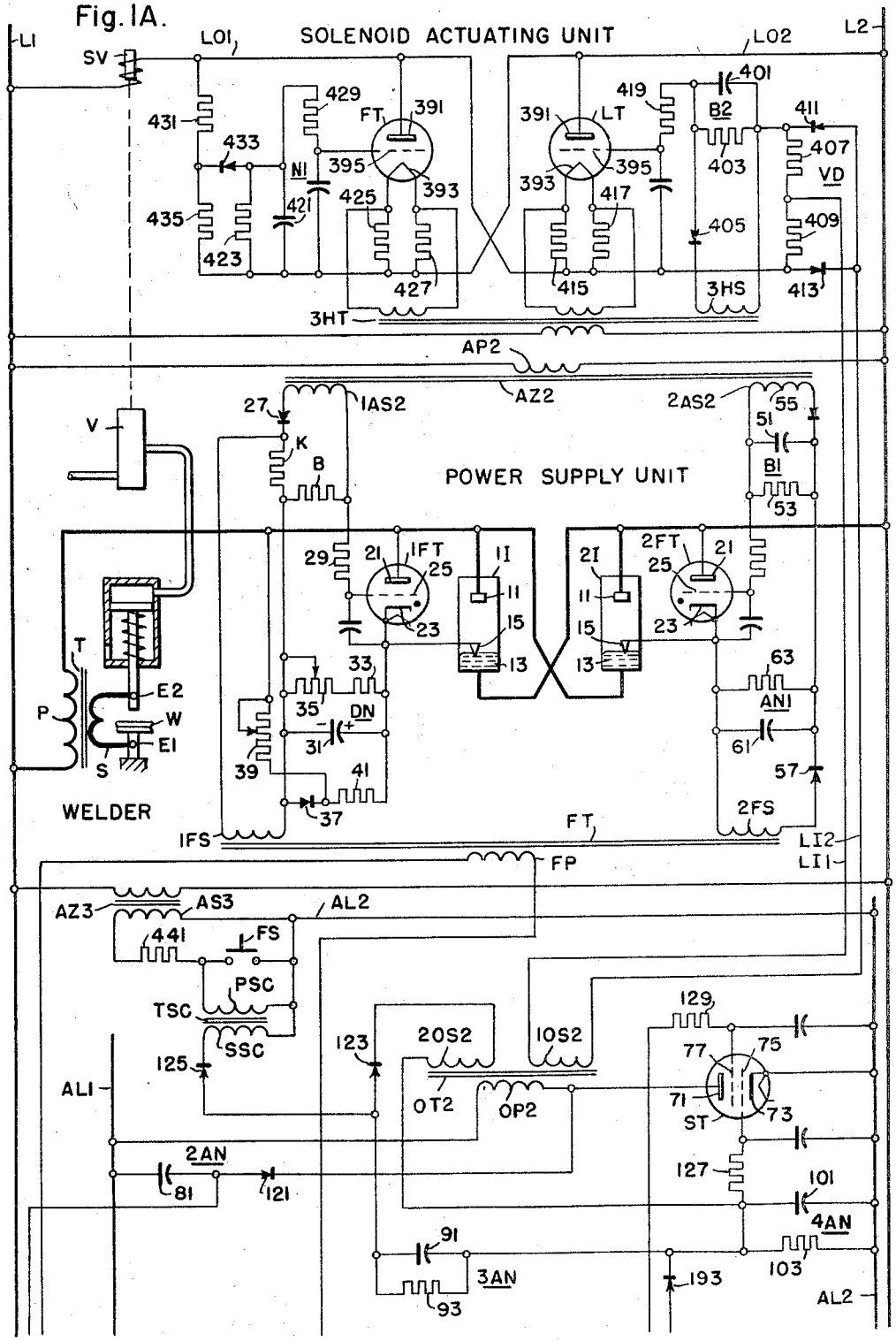

Nov. 25, 1958     H. W. VAN NESS     2,862,151

ELECTRIC DISCHARGE APPARATUS

Filed Sept. 30, 1954     3 Sheets-Sheet 1

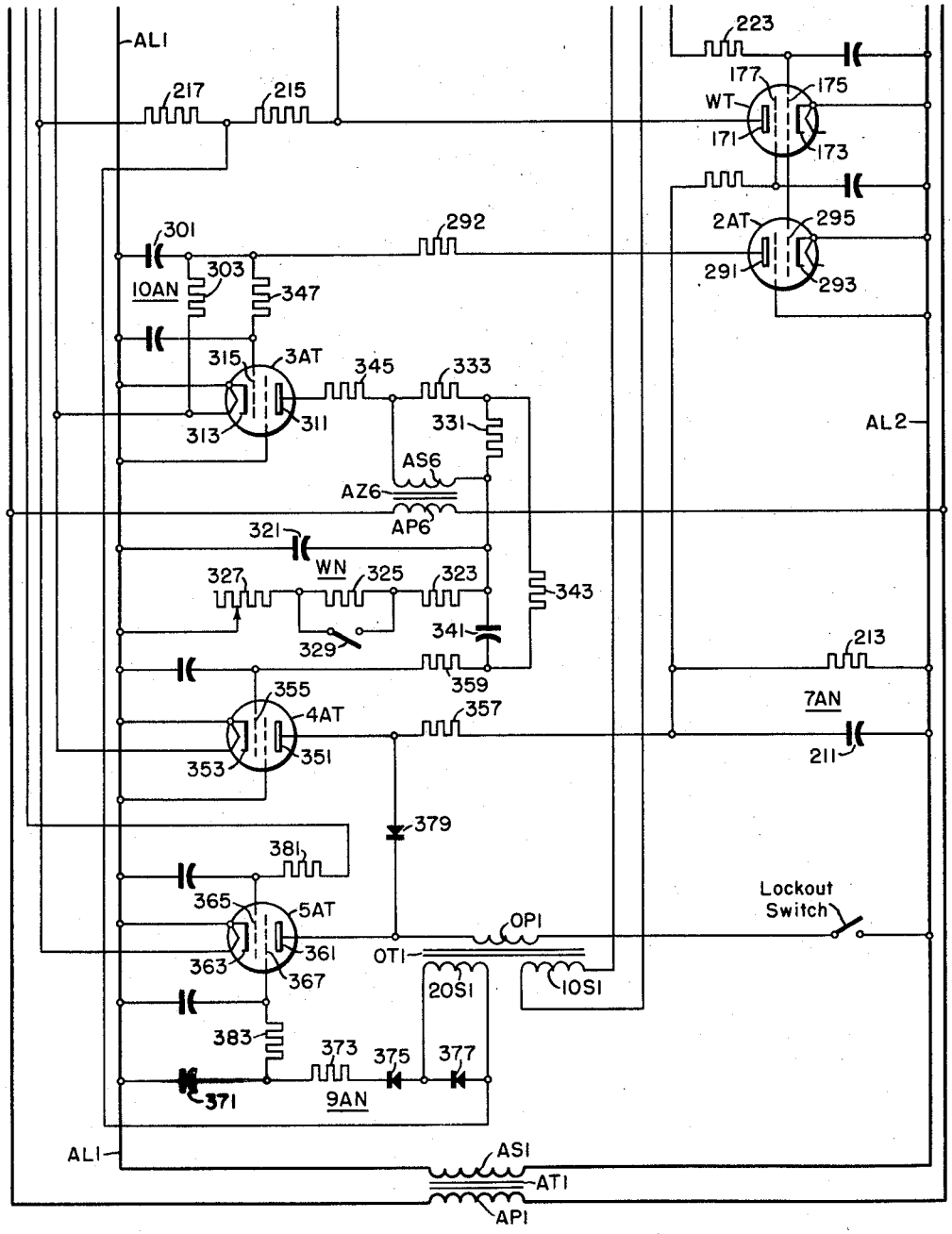
Fig. IC.

2,862,151
Patented Nov. 25, 1958

2,862,151

ELECTRIC DISCHARGE APPARATUS

Hubert W. Van Ness, East Aurora, N. Y., assignor to Westinghouse Electric Corporation, East Pittsburgh, Pa., a corporation of Pennsylvania Application September 30, 1954, Serial No. 459,331

8 Claims. (Cl. 315—251)

My invention relates to electric discharge apparatus and has particular relation to electric resistance welding apparatus. This application relates to my application Serial No. 459,332, now U. S. Patent No. 2,802,146, filed concurrently with this application and assigned to Westinghouse Electric Corporation, and the disclosure of this latter application is included in the present application by reference.

Electric resistance welding apparatus includes a pair of electrodes which are engaged with the work being welded under pressure applied by a fluid medium such as compressed air. During the squeeze interval of a welding operation, a valve is opened and the fluid is transmitted to apply the pressure. The valve is solenoid actuated, and it has been found advantageous to supply current to the solenoid through electric discharge paths connected in a so-called follow circuit. (For example, see Undy application Serial No. 679,840, filed June 27, 1946.) In such a circuit the anodes, cathodes and control electrodes of the paths are so interconnected that one of the paths, which may be called the leading path, is adapted to be rendered conducting by potential impressed from an external system such as the squeeze component of a sequence timer, and the second path, which may be called the following path, becomes conducting in its turn in response to the conduction of the first path.

In accordance with the teachings of the prior art, the interconnection of the leading path and the control electrode of the following path is through the solenoid. That is, to render the following path conducting, the potential appearing across the solenoid is impressed in the control circuit of the following path (T5, Undy application). In using such prior art apparatus, I have found that the operation of the fluid pressure valve of the resistance welding apparatus is not as precise as is necessary for producing welds of high quality.

It is accordingly an object of my invention to provide electric resistance welding apparatus including a fluid pressure supply system having a valve which is solenoid actuable, in which the operation of the valve shall be precise and positive.

Another object of my invention is to provide a circuit for supplying the solenoid which actuates the valve controlling the fluid pressure for resistance welding apparatus, which circuit shall assure positive actuation of the valve.

A more general object of my invention is to provide a novel follow circuit.

A further object of my invention is to provide a novel circuit for supplying a reactive load with alternating current.

My invention arises from the realization that the lack of precision and positiveness in the operation of the valve of prior art apparatus is caused by the interconnection between the solenoid and the control circuit of the following path. The solenoid is in effect a load on the leading and following paths and the variations of this load, caused by the different paths and different components which may be used in the follow circuit, and by variations in the supply voltages, materially affects the operation of the follow circuit. In accordance with my invention, then, I provide a system in which the following path is controlled independently of the solenoid. Specifically, I provide a follow circuit in which the bias for maintaining the following path nonconducting is derived from the open circuit potential across the leading path. Once the leading path is rendered conducting, this open circuit potential disappears and following path also conducts.

Another cause of the above-mentioned deficiencies of the prior art apparatus for controlling the fluid supply valve of an electric resistance welder arises from the fact that the solenoid is itself reactive. In operation, then, each of the discharge paths which supply the solenoid valve tends to conduct during at least a portion of the half period following the one during which it is rendered conducting. There is, then, a delay in the conduction of each path caused by the carry-over conduction of the preceding path to conduct. During this carry-over interval for the following path, the cathode of the leading path is in effect at the potential of the anode of the leading path. Once the following path becomes nonconducting at some instant during the negative half period of anode-cathode potential for the following path, the cathode of the leading path suddenly drops from the anode potential of the following path to the potential of the opposite terminal of the supply. An intense field can thus be impressed between the control electrode and the cathode because of the suddenness of this change in potential. If this field is of negative polarity, it would have a tendency to cause cleanup of the gas within the leading path materially changing the electrical properties of the circuit. This cleanup is, in accordance with my invention, eliminated by providing in the control circuit of the leading path a voltage doubler circuit for receiving the energizing signal from the sequence timer. This circuit maintains the potential in the control circuit of the leading path sufficiently positive to prevent the cleanup.

The novel features that I consider characteristic of my invention are described generally above. The invention itself, both as to its organization and its method of operation, will be understood from the following description of a specific embodiment when read in connection with the accompanying drawings, in which Figs. 1A, 1B and 1C together constitute a circuit diagram of a preferred embodiment of my invention.

Description

Figure 1B:
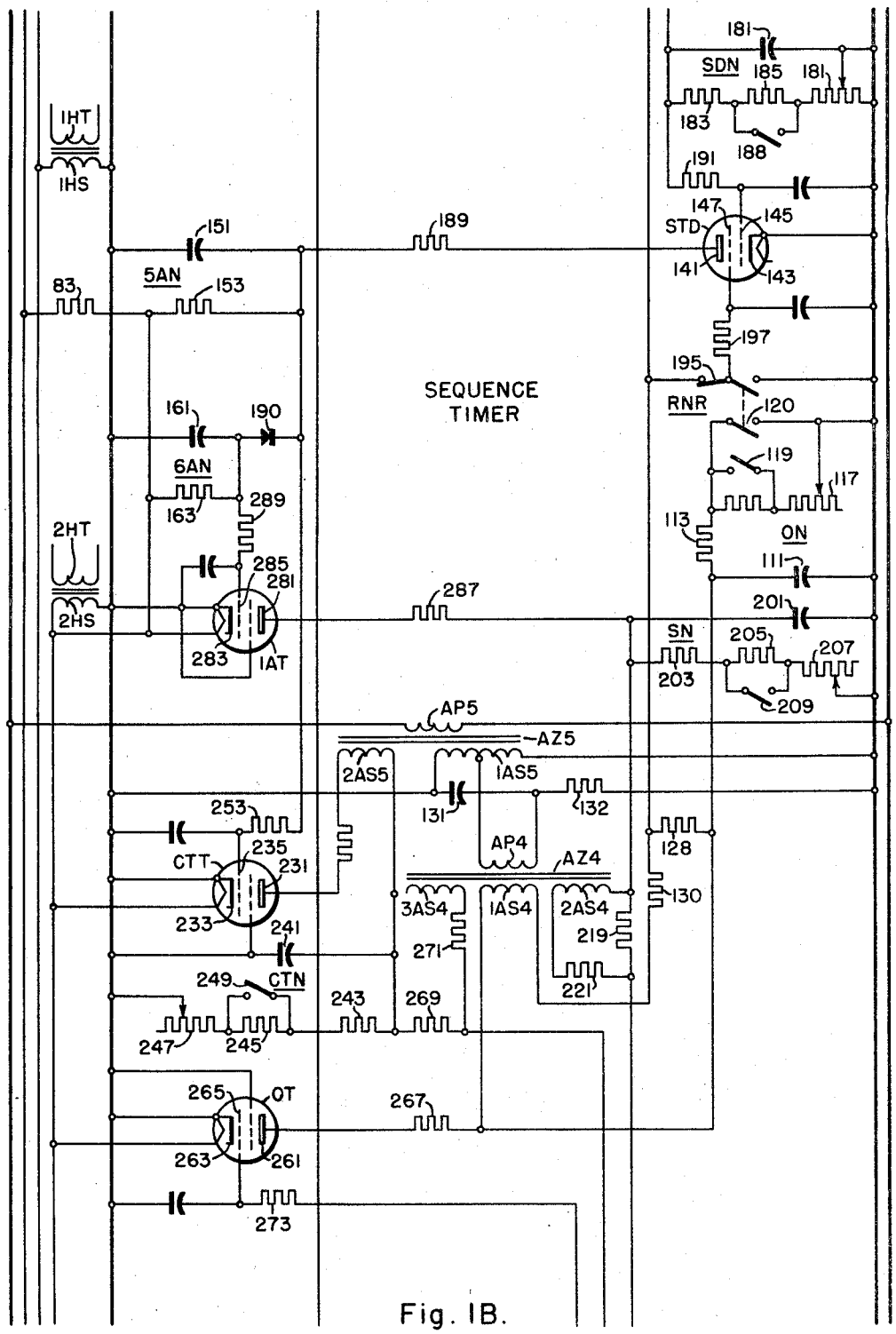

The apparatus shown in Figs. 1A, 1B and 1C is a complete welding system including a Welder, a Power Supply Unit, a Solenoid Actuating Unit and a Sequence Timer. This apparatus is supplied from buses or conductors L1 and L2 which may derive their power from the 220 or 440 volt (or higher voltage) buses of a commercial supply and are adapted to be connected to the supply through circuit breakers or disconnect switches (not shown). The Sequence Timer, which requires a lower voltage than that available at conductors L1 and L2, is preferably supplied from auxiliary buses or conductors AL1 or AL2 energized from a transformer AT1, the primary AP1 of which is supplied from the conductors L1 and L2.

The Welder includes a welding transformer T having a primary P and a secondary S. Welding electrodes E1 and E2 are connected across the secondary S, electrode E2 being actuable into engagement with work disposed between the electrodes under fluid pressure controlled by a valve V. The valve is actuable by a solenoid SV which is itself supplied from the Solenoid Actuating Unit.

The Power Supply Unit includes a pair of ignitrons 1I and 2I. Each ignitron has an anode 11, a cathode 13 and an igniter 15. The anodes 11 and cathodes 13 of the ignitrons 1I and 2I are connected in antiparallel, or inverse parallel, between the conductors L1 and L2 through the primary P. The ignitrons are controlled from firing thyratrons 1FT and 2FT respectively, each of which has an anode 21, cathode 23 and a control electrode 25. The anode 21 of thyratron 1FT is connected to the anode 11 of the associated ignitron 1I and the cathode 23 of thyratron 1FT is connected to the associated ignitor 15. The anode 21 of thyratron 2FT is connected to the anode 11 of the associated ignitron 2I and the cathode 23 is connected to the associated ignitor 15.

The control cicuits of firing thyratrons 1FT and 2FT are interconnected as described in detail in my other concurrently filed application. Thyratron 1FT, which is rendered conducting first in the operation of the apparatus, is supplied with a composite control potential having two components. One of these is derived from the secondary 1AS2 of a transformer AX2. This component is impressed across a resistor B which is connected across the secondary 1AS2 through a rectifier 27 and a resistor K. The other component is derived from a network DN including a capacitor 31 shunted by a fixed resistor 33 and a variable resistor 35. This network DN derives its potential from the open circuit potential available across thyratron 2FT and ignitron 2I. The network DN is connected in a circuit extending from the anode 21 of thyratron 2FT, the cathode 13 and the ignitor 15 of ignitron 1I, the network DN, the rectifier 37 and the variable resistor 39 to the anode 21 of thyratron 1FT. The rectifier 37 is so poled that when the anode 21 of thyratron 2FT is positive relative to its cathode 23, current can flow through this circuit to charge the capacitor of the network DN with its plate connected to the ignitor 13, that is, to the cathode 23 of thyratron 1FT positive, and the other plate negative. A resistor 41 is also connected between the cathode 23 of thyratron 1FT and the junction of the rectifier 37 and the variable resistor 39.

The resistor B is connected at one terminal to the control electrode 25 of thyratron 1FT through a grid resistor 29 and at the other terminal to the negative terminal of the network DN. The rectifier K through which resistor B is charged is poled so that its terminal connected to the control electrode 25 is negative and the other terminal is positive. The network DN and resistor B thus together impress a negative control potential between the control electrode and the cathode of thyratron 1FT in the quiescent condition of the apparatus.

The control circuit of thyratron 1FT in addition includes facilities for supplying a potential across resistor K to block the flow of current through the rectifier 27 in series with resistor K. This potential is derived from the secondary 1FS of a firing transformer FT when the latter is energized.

The thyratron 2FT is controlled independently of the thyratron 1FT from a blocking bias network B1, consisting of a capacitor 51 shunted by a resistor 53 and a counteracting network AN1 consisting of a capacitor 61 shunted by a resistor 63. The blocking bias network is supplied from the secondary 2AS2 of the transformer AS2 through a rectifier 55. The network AN1 is supplied from the secondary 2FS of the firing transformer FT through another rectifier 57. Network B1 is connected at one terminal to the control electrode 25 of thyratron 2FT through a grid resistor 65. At its other terminal it is connected through network AN1 to the cathode 23 of thyratron 2FT. The rectifiers 55 and 57 through which networks B1 and AN1 respectively are supplied are so poled that network B1 impresses a potential tending to maintain the control electrode 25 of thyratron 2FT negative relative to its cathode 23, and network AN1 impresses a potential to counteract the potential of network B1 and permit thyratron 2FT to conduct.

The Sequence Timer may be of any type available in the art, but the one shown is of the type suitable for high speed welding, used widely in the automotive industry. This Sequence Timer is designed to permit welding at a speed of as high as 400 welds per minute, and its principal feature is that it provides a signal for starting the opening of the welding electrodes before the supply of welding current has stopped, that is, the time during which the electrodes E1 and E2 are closed, which is called the closed time, as timed by the Sequence Timer terminates before the weld time. In addition, the Sequence Timer includes facilities for delaying the beginning of the weld interval during the first weld for a longer time interval than during subsequent welds to compensate for the longer time required by the welding electrode E2 to move into engagement with the work W during the first weld than during subsequent welds. With the Sequence Timer disclosed the Welder used would probably be of the gun type.

The Sequence Timer includes a plurality of main thyratrons, that is, a squeeze thyratron ST, a squeeze delay thyratron STD, a weld thyratron WT, a closed time thyratron CTT, and an off thyratron OT. In addition, there are a plurality of auxiliary thyratrons 1AT, 2AT, 3AT, 4AT and 5AT. The Sequence Timer also includes a plurality of main timing networks, a squeeze delay network SDN, a squeeze network SN, a weld network WN, a closed time network CTN and an off network ON. There are also a plurality of auxiliary networks 2AN, 3AN, 4AN, 5AN, 6AN, 7AN, 8AN, 9AN and 10AN. The operation of the Sequence Timer is started by a low voltage starting circuit SC.

The starting circuit includes a transformer TSC having a low voltage primary PSC and a secondary SSC capable of delivering a higher voltage of the order of 115 volts. The primary PSC is supplied with potential from the secondary AS3 of a transformer AZ3, the primary of which is connected to the conductors L1 and L2. A switch FS for starting the operation of the apparatus which may be the useful foot switch on the Welder is connected in parallel with the primary PSC.

The squeeze thyratron ST has an anode 71, a cathode 73, a first control electrode 75 and a second control electrode 77. The network 2AN consists of a capacitor 81 shunted by a resistor 83 and the secondary 2HS of the heater transformer 2HT for certain of the thyratrons. The network AN consists of a capacitor 91 shunted by a resistor 93 and the network 4AN consists of a capacitor 101 shunted by a resistor 103. The off network ON consists of a capacitor 111 shunted by a pair of fixed resistors 113 and 115 and a variable resistor 117. One of these resistors 115 may be shunted out by a switch 119 when it is desirable that the squeeze time be short. In addition, the variable resistor 117 and this latter fixed resistor 115 may also be shunted out by one of the contacts 120 of the repeat-nonrepeat RNR switch in the nonrepeat setting of the apparatus.

The anode 71 of the squeeze thyratron ST is connected to the conductor AL1 through two branch circuits. One of these includes a rectifier 121 and the network 2AN. The rectifier 121 is poled to conduct positive current from the conductor AL1 to the anode, that is, in the direction of the flow of the current through the thyratron ST. The other branch includes the primary OP2 of an output transformer OT2 having a pair of secondaries 10S2 and 20S2. One of these secondaries 10S2 is connected to the input conductors LI1 and LI2 of the Solenoid Actuating Unit. The other secondary 20S2 is connected through a rectifier 123 across the network 3AN.

The cathode 73 of the thyratron ST is connected directly to the conductor AL2. The secondary SSC of the transformer TSC is connected through a rectifier 125, the network 3AN, and a grid resistor 127 to the first control electrode 75 of the thyratron ST. This control electrode 73 is connected to the cathode 73 of the thyratron ST through the network 4AN and the grid resistor 127. The rectifier 123 connected to the secondary 2OS2 is poled to conduct in such manner that when the secondary 2OS2 is energized the plate of the capacitor electrically nearest the rectifier 123 is charged highly negative. The rectifier 125 connected to the secondary SSC is poled to conduct positive current from the network 3AN to the secondary. The charge on the network 3AN when the secondary 2OS2 is energized is thus of the same polarity as that supplied through the secondary SSC. The potential available at the secondary 1OS2 when thyratron ST is conducting is such that the potential on network 3AN is adequate to block conduction from secondary SSC.

The network ON is connected between the second control electrode 77 and the cathode 73 of thyratron ST through a resistor 128 and a grid resistor 129. A ripple potential is supplied across the first resistor 129 from the secondary 1AS4 of a transformer AZ4 through another resistor 130. The primary AP4 of the transformer AZ4 is supplied from a phase shift network including a transformer AZ5 having a primary AP5 supplied from the conductors L1 and L2 and a pair of secondaries 1AS5 and 2AS5. The secondary 5AS1 has an intermediate tap and across its terminal taps are connected a capacitor 131 in series with a resistor 132. The primary AP4 is connected between the intermediate tap and the junction of the capacitor 131 and the resistor 132. The capacitor 131 and resistor 132 are dimensioned to provide a phase shift such that the ripple potential impressed across the resistor in series with the off network ON leads the potential between the anode and the cathode of the thyratron ST by approximately 1/6 of a period. The firing of the thyratron ST at the beginning of a half period during which it is to fire is thus assured.

The delay thyratron STD has an anode 141, a cathode 143, a first control electrode 145 and a second control electrode 147. The network 5AN has a capacitor 151 shunted by a resistor 153 and the secondary 2HS. The network 6AN includes a capacitor 161 shunted by a resistor 163 and the secondary 2HS. The delay network SDN includes a capacitor 181 shunted by a pair of fixed resistors 183 and 185 and a variable resistor 187. One of the fixed resistors 185 may be shunted out by a switch 188 when the delay time provided by the network SDN is to be short.

The anode 141 of thyratron SDT is connected to the conductor AL1 through an anode resistor 189 and two branch connections, one of which is the network 5AN and the other includes a rectifier 190 and the network 6AN. The rectifier 190 is poled to conduct positive current from the conductor AL1 to the anode 141, that is, to conduct the current of the thyratron STD. The squeeze delay network SDN is connected between the first control electrode 145 and the cathode 143 of the thyratron SDT through a grid resistor 191. The network SDN is also connected in parallel with the network 4AN through a rectifier 193 poled to conduct positive current from the network SDN to the network 4AN. Thus, the flow of current between networks 4AN and SDN is blocked, but the network SDN may be charged by the potential available across the secondary SSC if the secondary 2OS2 is deenergized. The network ON is connected between the other control electrode 147 and the cathode 143 of thyratron STD through the resistor 128 which provides the ripples, one of the contacts 195 of the repeat-nonrepeat switch RNR which is closed in the repeat position, and a grid resistor 197.

The weld thyratron WT has an anode 171, a cathode 173, a first control electrode 175 and a second control electrode 177. The squeeze network SN includes a capacitor 201 shunted by a pair of fixed resistors 203 and 205 and a fixed resistor 207. One of the fixed resistors 205 may be shunted out by a switch 209 when the squeeze time is to be short. The network 7AN includes a capacitor 211 shunted by a resistor 213.

The anode 171 of thyratron WT is connected to the conductor AL1 through two branch connections. One of these includes the primary FP of the firing transformer FT and the secondary 1HS of a heater transformer 1HT for the heaters of certain of the thyratrons of the Sequence Timer. The other branch connection includes a pair of resistors 215 and 217. The cathode 173 of the weld thyratron WT is connected directly to the conductor AL2. The squeeze network SN is connected between the first control electrode 175 and the cathode 173 of thyratron WT through a resistor 219 supplied from another secondary 2AS4 of the transformer 1AZ4 through another resistor 221 and a grid resistor 223. The first-mentioned resistor 219 supplies a ripple for firing the thyratron WT early during the half periods when it is to be fired in the same manner as the ripple supplied to the thyratrons ST and STD. The network 7AN is connected between the other control electrode 177 and the cathode 173 of the thyratron WT.

The closed time thyratron CTT includes an anode 231, a cathode 233 and a control electrode 235. The close time network CTN includes a capacitor 241 shunted by a pair of fixed resistors 243 and 245 and a variable resistor 247. One of the resistors 245 may be shunted out by a switch 249 when the closed time is to be short. The thyratron CTT is supplied from another secondary 2AS5 of transformer AZ5. One terminal of secondary 2AS5 is connected to the anode 231 of thyratron CTT through an anode resistor 251. The other terminal of the secondary is connected to the cathode 233 of thyratron CTT through the network CTN. The network 5AN is connected between the control electrode 235 and the cathode 233 of thyratron CTT through a grid resistor 253.

The network 5AN is so dimensioned that when it is charged and permitted to discharge, it discharges to a potential low enough to permit thyratron CTT to conduct in a time interval approximately one period longer than the interval by which the weld time may continue after the closed time network has timed out. For example, if the weld time may continue for two periods of the supply after the closed time network has timed out, the network 5AN is dimensioned to delay the conduction of the thyratron CTT by an interval of three periods.

The off thyratron OT has an anode 261, a cathode 263 and a control electrode 265. The anode 261 of the off thyratron OT is connected to the conductor AL2 through an anode resistor 267 and the off network ON. The cathode 263 is directly connected to the conductor AL1. The network CTN is connected between the control electrode 265 and the cathode 263 through a resistor 269 supplied from another secondary 3AS4 of the transformer AT4 through another resistor 271, the secondary 1OS1 of an output transformer OT1 and a grid resistor 273. The resistor 269 in this circuit provides a ripple for assuring that the thyratron OT is rendered conducting early in the half periods during which it is to conduct.

Thyratron 1AT has an anode 281, a cathode 283 and a control electrode 285. The anode 281 of thyratron 1AT is connected to the conductor AL2 through an anode resistor 287 and the squeeze network SN. The cathode 283 is directly connected to the conductor AL1. The network 6AN is connected between the control electrode 285 and the cathode 283 of thyratron 1AT through a grid resistor 289.

The thyratron 2AT has an anode 291, a cathode 293 and a control electrode 295. The network 10AN consists of a capacitor 301 shunted by a resistor 305 and the secondary 2HS. The anode 291 of thyratron 2AT is connected to conductor AL1 through the network 10AN and an anode resistor 292. The cathode 293 is directly connected to conductor AL2. The squeeze network SN is connected between the control electrode 295 and the cathode 293 of thyratron 2AT in the same manner as it is connected to the corresponding electrodes of the thyratron WT, that is, through the ripple resistor 219 and the grid resistor 223.

The thyratron 3AT has an anode 311, a cathode 313 and a control electrode 315. The network WN consists of a capacitor 321 shunted by a pair of fixed resistors 323 and 325 and a variable resistor 327. One of the fixed resistors 325 may be shunted out by a switch 329 when the weld interval is to be short. The thyratron 3AT is supplied with potential from a transformer AZ6 having a primary AP6 and a secondary AS6. The secondary AS6 is loaded by a pair of resistors 331 and 333, one of which 331 is shunted by a capacitor 341 and another resistor 343. One terminal of the secondary AS6 is connected to the anode 311 through an anode resistor 345. The other terminal is connected to the cathode through the network WN. The network 10AN is connected between the control electrode and the cathode of thyratron 3AT through a grid resistor 347.

The thyratron 4AT has an anode 351, a cathode 353 and a control electrode 355. The anode 351 of this thyratron is connected through an anode resistor 357 and the network 7AN to the conductor AL2. The cathode 353 is directly connected to the conductor AL1. The network WN is connected between the control electrode 355 and the cathode 355 through one of the resistors 331 which loads the secondary AS6, another resistor 343 and a grid resistor 359.

The thyratron 5AT has an anode 361, a cathode 363, a first control electrode 365, and a second control electrode 367. The network 9AN consists of a capacitor 371 having connected in parallel therewith a resistor 373 and a pair of rectifiers 375 and 377, one of which 377 is shunted by the secondary 20S1 of the transformer OT1. The anode 361 of the thyratron 5AT is connected to the conductor AL2 through two branch networks; one, the primary OP1 of the transformer OT1, and the other, a rectifier 379, the resistor 357 and the network 7AN. The anode 361 of the thyratron 5AT is thus connected to the anode 351 of thyratron 4AT through rectifier 379. The rectifier 379 is poled to conduct positive current from the anode of thyratron 4AT to the anode of the thyratron 5AT. Thus, the rectifier 379 conducts current through the thyratron 5AT and through the network 7AN. The network 2AN is connected between the first control electrode 365 and the cathode 363 of the thyratron 5AT through a grid resistor 381. The network 9AN is connected between the second control electrode 367 and the cathode 363 of the thyratron 5AT through another grid resistor 383. The capacitor 371 of the network 9AN is also connected between the second control electrode 367 and the cathode 363 through the secondary 1HS and one of the resistors 217 supplied by the weld thyratron WT.

The Solenoid Actuating Unit includes a pair of thyratrons LT and FT each having an anode 391, a cathode 393 and a control electrode 395. The thyratron LT is the leading thyratron and the thyratron FT the following thyratron. The anodes 391 and the cathodes 393 are connected in anti, or inverse, parallel between the conductors L1 and L2 through the coil of the solenoid SV and the output conductors LO1 and LO2.

To maintain the thyratron LT nonconducting a bias network B2 is provided, and is supplied with potential from one of the secondaries 3HS1 of the heater transformer 3HT for the thyratrons FT and LT through a rectifier 405. The bias network B2 consists of a capacitor 401 shunted by a resistor 403. The potential for counteracting this bias is derived through a voltage doubler VD from the conductors LI1 and LI2 which are connected to the secondary 10S2 of the transformer OT2. The primary OP2 of this transformer is supplied with current pulses of only one polarity through the thyratron ST, but the potential appearing across the secondary 10S2 and the conductors LI1 and LI2 has a positive loop followed by a negative tail. This voltage doubler includes a pair of resistors 407 and 409 connected in series. The conductor LI2 is connected to one terminal of one of the resistors 407 through a rectifier 411 poled to conduct positive current toward this terminal. The opposite terminal of the other resistor 409 is connected to the same conductor LI2 through a second rectifier 413 poled to conduct positive current from the terminal to the conductor. The conductor LI1 is connected to the junction of the resistors 407 and 409. Current thus flows through the resistors 407 and 409 in the same direction during the interval during which the main potential appears across the secondary 10S2 and also during the interval during which the tail potential appears across this secondary.

The terminals of the cathode 393 of thyratron LT are connected together through a pair of low resistance equalizing resistors 415 and 417. The network B2 and the voltage doubler network VD are connected between the control electrode 395 and the junction of the equalizing resistors 415 and 417 through a grid resistor 419. The rectifier 405 is so poled that network B2 impresses a blocking bias between the control electrode 395 and the cathode 393 and the voltage doubler circuit VD is so poled as to impress a potential counteracting this bias.

The following thyratron FT is supplied with control potential from a network N1 consisting of a capacitor 421 shunted by a resistor 423. The terminals of the cathode 393 of the thyratron FT are also connected together through a pair of low resistance equalizing resistors 425 and 427. The control electrode 395 of thyratron FT is connected to the junction of the equalizing resistors through the network N1 and a grid resistor 429. The network N1 is connected through a resistor 431 and a rectifier 433 to the anode 391 of thyratron FT. The rectifier 433 is poled to conduct positive current from the network N1 to the anode 391. Current then flows through the network N1 and the rectifier 433 only during the intervals when the potential of the anode 391 of thyratron LT is positive relative to its cathode 393, that is, during the intervals when the anode-cathode potential of the thyratron FT is negative. Naturally this current only flows if there is open circuit potential across thyratron LT and not when thyratron LT conducts. It is seen that when current does flow to charge network N1, this network is charged so as to prevent conduction of thyratron FT. The rectifier and network N1 are shunted by a resistor 435.

*Components of an operating system*

It appears desirable to tabulate the components of a system which I have found to operate satisfactorily. But it is to be kept in mind that these components may be changed both as to kind and magnitude over a wide range without departing from my invention.

The components for the Power Supply Unit are presented in my concurrently filed application Serial No. 459,332,, now U. S. Patent No. 2,802,146, and need not be reproduced here. The components of the Sequence Timer are as follows:

| | |
|---|---|
| Thyratrons ST, STD, WT, CCT, OT, 1AT, 2AT, 3AT, 4AT, 5AT | All WL–2050. |
| Voltage across secondary AS3 | 24 volts. |
| Voltage across primary PSC | 24 volts. |
| Resistor 441 in series with secondary AS3 and primary PSC | 330 ohms. |
| Voltage across secondary SSC | 115 volts. |
| Voltage across secondary 1AS5 | 115 volts. |
| Phase shift capacitor 131 | 1 microfarad. |
| Phase shift resistor 132 | 2350 ohms. |
| Voltage across primary AP4 | 80 volts. |
| Voltage across secondary 2AS5 | 115 volts. |
| Voltage across secondary AS6 | 115 volts. |
| Capacitor 81 network 2AN | .047 microfarad. |
| Resistor 83 network 2AN | .33 megohm. |

| Component | Value |
|---|---|
| Capacitor 91 network 3AN | 1 microfarad. |
| Resistor 93 network 3AN | 10,000 ohms. |
| Capacitor 101 network 4AN | 1 microfarad. |
| Resistor 103 network 4AN | 10,000 ohms. |
| Capacitor 181 network SDN | .25 microfarad. |
| Variable resistor 187 network SDN | 1 megohm. |
| Fixed resistors 183 and 185 network SDN | 22,000 ohms. |
| Capacitor 151 network 5AN | .049 microfarad. |
| Resistor 153 network 5AN | 68,000 ohms. |
| Capacitor 161 network 6AN | .5 microfarad. |
| Resistor 163 network 6AN | 22,000 ohms. |
| Capacitor 111 off network ON | 1 microfarad. |
| Variable resistor 117 off network ON | 70,000 ohms. |
| Shunted fixed resistor 115 network ON | 75,000 ohms. |
| Other fixed resistor 113 network ON | 4700 ohms. |
| Anode resistor 189 thyratron STD | 100 ohms. |
| All ripple resistors 128, 219, 269 | 1000 ohms. |
| Anode resistor 287 thyratron 1AT | 100 ohms. |
| Capacitor 201 squeeze network | 1 microfarad. |
| Variable resistor 207 network SN | 70,000 ohms. |
| Shunted fixed resistor 205 network SN | 75,000 ohms. |
| Other fixed resistor 203 network SN | 2700 ohms. |
| Anode resistor 251 thyratron CTT | 100 ohms. |
| Capacitor 241 network CTN | 1 microfarad. |
| Variable resistor 247 network CTN | 70,000 ohms. |
| Shunted resistor 245 network CTN | 75,000 ohms. |
| Other resistor 243 network CTN | 4700 ohms. |
| Anode resistor 267 thyratron OT | 100 ohms. |
| First resistor 215 | 33,000 ohms. |
| Second resistor 217 | 4700 ohms. |
| Secondary 1HS | 6.3 volts R. M. S. |
| Anode resistor 292 thyratron 2AT | 100 ohms. |
| Capacitor 301 network 10AN | .5 microfarad. |
| Resistor 303 network 10AN | 6800 ohms. |
| Anode resistor 311 thyratron 3AT | 100 ohms. |
| Loading resistor 333 AS6 | 15,000 ohms. |
| Capacitor 341 | .5 microfarad. |
| Resistor 343 | 15,000 ohms. |
| Capacitor 321 weld network | 1 microfarad. |
| Variable resistor 327 weld network | 70,000 ohms. |
| Shunted resistor 325 weld network | 75,000 ohms. |
| Other resistor 323 weld networks | 4700 ohms. |
| Anode resistor 357 thyratron 4AT | 1000 ohms. |
| Capacitor 211 network 7AN | .5 microfarad. |
| Resistor 213 network 7AN | 6800 ohms. |
| Resistor 373 network 9AN | 10,000 ohms. |
| Capacitor 371 network 9AN | 1 microfarad. |
| Grid resistors | All .1 megohm. |
| Surge suppressor capacitors (not labeled) | All .002 microfarad. |
| Solenoid actuating unit: | |
| Thyratrons FT and LT | WL–5683. |
| Resistor 403 network B2 | 42,000 ohms. |
| Capacitor 401 network B2 | .5 microfarad. |
| Voltage 3HS1 | 45 volts. |
| Resistors 407, 409 voltage doubler VD | 33,000 ohms each. |
| Equalizing resistors 415, 417, 425, 427 | 1 ohm each. |
| Capacitor 421 network N1 | .5 microfarad. |
| Resistor 423 network N1 | 6000 ohms. |
| Resistor 431 | 10,000 ohms. |
| Resistor 435 | 3000 ohms. |

*Standby*

The apparatus will be described with the repeat-nonrepeat switch RNR in the repeat position, and the various timing networks set for their long times.

During the standby condition, the switches or circuit interrupters (not shown) between the conductors L1 and L2 and the supply are closed and these conductors are energized. The cathodes and heaters of the various thyratrons are then energized as are the supply transformers.

In the standby condition of the apparatus, the switch FS is open and the network 4AN is charged by the potential across SSC so that thyratron ST is nonconducting. Transformer OT2 is then deenergized and there is no potential across secondaries 10S2 and 20S2. The voltage doubler VD is then deenergized and the bias network B2 maintains the leading thyratron LT of the Solenoid Actuating Unit nonconducting. The network N1 is then charged by the open circuit voltage across thyratron LT when the anode 391 of the latter is positive relative to its cathode 393. The charge on this network N1 is maintained by its resistor 423 during the succeeding half period during which the anode 391 of thyratron FT is positive relative to the cathode 393 and thyratron FT is also maintained nonconducting. Solenoid SV is then deenergized and valve V is closed so that electrode E2 is retracted from electrode E1. In addition, because there is no potential across secondary 20S, network 3AN is uncharged.

Since thyratron ST is not conducting, network 1AN is uncharged. This network, then, does not impress a potential on the first control electrode 365 of thyratron 5AT. But the second control electrode 367 of thyratron AT is connected in circuit with the capacitor 371 of network 9AN, the resistor 217 in circuit with thyratron WT and the secondary 1HS. This secondary is so poled that its potential is in opposite phase to the potential impressed between the anode 361 and the cathode 363 of thyratron 5AT and a blocking potential is thus impressed during the negative half periods of anode-cathode potential of thyratron 5AT across the capacitor 371 of network 9AN which maintains the second control electrode 317 of thyratron 5AT negative relative to the cathode 363. Thus thyratron 5AT does not conduct.

Since the switch FS is open and there is no potential across the secondary 20S2, the network SDN is also charged by the secondary SSC. This network maintains thyratron STD nonconducting. Networks 4AN and 5AN are then uncharged and thyratrons 1AT and CTT are conducting. Thyratron 1AT charges network SN and thyratron CTT network CTN. Since network SN is charged, thyratrons WT and 2AT are nonconducting. Since thyratron 5AT is nonconducting, transformer OT1 is deenergized and there is no potential across secondary 10S1, but since network CTN is charged, thyratron OT is maintained nonconducting by the charge on network CTN. Network ON is then uncharged, but this does not affect thyratrons ST and STD which are maintained nonconducting by networks 4AN and SDN respectively.

Since thyratron 2AT is nonconducting, network 9AN is uncharged and thyratron 3AT is conducting. Since thyratron 3AT is conducting, network WN is charged and thyratron 2AT is nonconducting. Network 6AN is then uncharged, but thyratron WT is nonconducting because it is being maintained so by network SN.

Since thyratron WT is nonconducting, transformer FT is deenergized and there is no potential across the secondaries 1FS and 2FS. Thyratron 2FT is then maintained nonconducting by bias B1. Since thyratron 2AT is nonconducting, network DN is charged by the open circuit potential available across thyratron 2FT and ignitron 2I. Network DN when charged tends to discharge in an interval of the order of one-half a period of the supply. If this network alone were connected in the control circuit of thyratron 1FT, then thyratron 1FT would conduct. But in addition to the potential of network DN, the potential of resistor B is impressed in the control circuit of thyratron 1FT and the potentials of resistor B and network DN together maintain thyratron 1FT nonconducting. Since thyratrons 1FT and 2FT are nonconducting, ignitrons 1I and 2I are nonconducting and transformer T is deenergized.

The condition of the apparatus when set for standby is not affected by the position of the repeat-nonrepeat switch RNR. The apparatus is then in the same condition as described with the switch RNR in the nonrepeat position.

*Operation—Fig. 1.—Repeat*

The operation of the apparatus will be described with the switch in the repeat position. If the apparatus is also operating to produce high speed welds, the networks SDN, SN, ON, CTN and WN are set for short time intervals and the shuntable resistors 185, 205, 115, 245, 225 respectively are shunted out.

To initiate a welding operation, the starting switch FS is closed. The closing of this switch shunts the primary PSC and the potential across the secondary SSC disappears. Network 4AN then discharges in an interval of the order of one period of the supply to permit thyratron ST to conduct. Current now flows through primary OP2 and potential appears across the secondaries 10S2 and 20S2. The potential across secondary 20S2 causes network 3AN to charge. This network prevents further charging of network 4AN even if switch FS is now opened and locks the system in independently of the position of switch FS. The potential across secondary 10S2 provides potential across the voltage doubler circuit VD which counteracts the blocking bias of network B2 and thyratron LT becomes conducting.

Current then flows through this thyratron and through the coil of the solenoid SV. In addition, when thyratron LT conducts, the potential for charging the network N1 disappears and this network discharges. The time of discharge of the network N1 is such that thyratron FT may conduct at the beginning of the next positive half period of anode-cathode potential impressed on it, and thyratron FT then follows thyratron LT conducting during the half period after LT conducts. Thus, for the first half cycle of current transmitted through thyratron ST, thyratrons LT and FT are rendered conducting during a whole period. Thyratron LT conducts during the first half period and during a portion of the second half period because of the reactive effect of the solenoid SV. While thyratron LT is conducting, its cathode 393 is very near the potential of its anode 391. When thyratron LT is rendered nonconducting some time during the second half period, the cathode 393 of thyratron LT suddenly rises to the potential of the anode 391 of thyratron FT just before the latter becomes conducting. This sudden rise in potential would tend to produce a high field between the control electrode 395 and the cathode 393 of thyratron LT which would tend to cause thyratron LT to clean up, but the effect of this field is reduced because during the time when the cathode 393 of thyratron LT is becoming abruptly positive, there is potential across the voltage doubler VD produced by the tail voltage of secondary 10S2 tending to maintain the control electrode 395 of thyratron LT correspondingly positive. Thus damage to thyratron LT is prevented.

Thyratron ST conducts during alternating half periods, and during each of the half periods when it conducts it renders thyratrons LT and FT conducting during a whole period.

The conduction of thyratrons LT and FT and the resulting transmission of current through the coil of the solenoid SV actuates the solenoid, opening the valve V and permitting fluid pressure to move the electrode E2 into engagement with the work W.

The closing of switch FS also starts the discharging of network SDN. During the first welding cycle, following the closing of the switch FS, electrode E2 moves over a relatively long distance. During the time consumed by this movement the network SDN is discharged. Network SDN times out when the electrode E2 for the first time properly sets itself on the work W. Thyratron STD is then rendered conducting. The conduction of thyratron STD charges network 5AN and network 6AN. The charging of these networks causes thyratrons 1AT and CTT to become nonconducting.

When thyratron 1AT becomes nonconducting the squeeze network SN times out. When thyratron CTT becomes nonconducting the closed time network CTN times out. The timing out of the squeeze network permits thyratron WT to conduct and it conducts during alternate half periods. This thyratron supplies current to energize the primary FP. Potential then appears across the secondaries 1FS and 2FS. This potential appears during each of the half periods during which thyratron WT conducts. The potential which appears across the primary 1FS produces a potential drop across resistor K which blocks the flow of current through the resistor B and the voltage across resistor B disappears. The network DN was charged during the half period just preceding the one during which thyratron WT was rendered conducting. This network is discharging at the beginning of the half period during which thyratron WT is conducting and at the beginning of this half period it has enough charge to prevent thyratron 1FT from conducting. But the network DN has a time constant such that it discharges sufficiently to permit thyratron 1FT to conduct in the absence of potential across resistor B at approximately ¼ period after the beginning of this first half period. Thyratron 1FT then conducts. Ignitron 1I is then rendered conducting and current flows upward through the primary P. Current is induced in the secondary S and flows through the work.

The potential which appears across the secondary 2FS when current is flowing through the secondary 1FS is impressed on the network AN1. The time constant of the network AN1 is such that at the end of the half period of positive anode-cathode potential for ignitron 1I, the potential on network AN1 is still adequate to counteract the potential on biasing network B1. Thyratron 2FT is then rendered conducting at the beginning of its positive half period of anode-cathode potential. Ignitron 2I is then fired and current flows downward through the primary P and through secondary S to weld the work W. During the succeeding positive half period of its potential, thyratron WT is now again rendered conducting and again the potential across resistor B is not present. Since thyratron 2I conducted during the just preceding half period, the charging potential for network DN was shunted out by ignitron 2I and the network DN is substantially uncharged at the beginning of the half period of positive anode-cathode potential for thyratron 1FT. Thyratron 1FT is then rendered conducting at the beginning of this half period, firing ignitron 1I and causing current to flow through the primary P and the secondary S and the work W. During the succeeding half period, ignitron 2I is again rendered conducting and the above-described process repeated. The above-described process is repeated for each half period during which thyratron WT conducts and ignitrons 1I and 2I thus conduct to supply welding current to the work W during a number of periods equal to the number of half periods during which thyratron WT conducts.

In addition, the conduction of thyratron WT causes current to flow through the resistors 215 and 217 in series with it. One of these resistors is also connected in series with the secondary 1HS. The current flow through this resistor is of such polarity and phase as to counteract the effect of the potential impressed from the secondary 1HS and the capacitor 371 in network 9AN is not charged and is permitted to discharge. But so long as thyratron ST is conducting, network 2AN is charged and thyratron 5AT is maintained nonconducting by the potential impressed on its control electrode 365 by network 2AN.

While thyratron WT is conducting, the network CTN is timing out. When the apparatus is set for high speed welding, this network times out before network WN. The delay between the timing out of network WN and the timing out of network CTN is usually of the order of one or two periods of the supply and is ordinarily not more than two periods.

When network CTN times out, thyratron OT is rendered conducting, charging network ON. The charging of network ON renders thyratrons ST and STD nonconducting in spite of the fact that in repeat operation the switch FS remains closed and network 4AN remains uncharged at this point.

It is desirable here to digress and consider the operation of thyratron 5AT. The stopping of the conduction of thyratron ST stops the charging of network 2AN, but this network is set to discharge during a predetermined time interval which is approximately one period longer than the interval during which the weld interval extends beyond the closed time interval. For the time being, then, the discharging of network 2AN has no effect. The charge on network 2AN then continues to maintain thyratron 5AT nonconducting during this weld interval. If the Sequence Timer is operated manually and thyratron WT now stops conducting when it should within about one period of the end of the timing interval of network 2AN, secondary 1HS again becomes effective to charge the capacitor 371 in the network 9AN and thus to maintain thyratron 5AT nonconducting.

In addition, the stopping of conduction through thyratron ST stops flow of current through primary OP2 and secondaries 10S2 and 20S2. The interruption of the flow of current through the secondary 10S2 causes the potential from the voltage doubler VD to disappear. Thyratron LT then fails to conduct in its turn and during the half period when thyratron LT fails to conduct, network N1 is charged blocking thyratron FT. Solenoid SV is then deenergized, valve V closes and electrode E2 is retracted from the work W. This operation is started while the weld interval is still in progress and the electrode E2 is completely retracted from the work W just after the weld interval comes to an end. The absence of potential on secondary 20S2 removes the charging potential from network 3AN but this has no effect since in repeat operation switch FS remains closed.

Now the explanation of the operation of the Sequence Timer may be continued, assuming that it is operating normally. The stopping of the conduction of thyratron STD permits network 5AN to time out. This network has a timing interval of the same order as network 2AN, that is, the interval is approximately one period longer than the excess of the weld interval over the closed time interval. For the time being, then, thyratron 1AT remains nonconducting, and the squeeze network SN remains uncharged.

In addition, the stopping of the conduction of thyratron STD permits network 6AN to time out. This network times out in a short time interval of the order of one period, permitting thyratron CTT to conduct. Thyratron CTT renders thyratron OT nonconducting, starting the timing out of the off network ON. In the meantime, the weld network WN times out, permitting thyratron 4AT to conduct. Network 7AN is then charged, blocking thyratron WT. The current flow through primary FP is interrupted and the potential across resistor K disappears. Now the bias B becomes effective blocking thyratron IFT, and the latter does not conduct in its turn. The potential across secondary 2FS also disappears and network AN1 is not charged so that thyratron 2FT is blocked. The Power Supply Unit is then quiescent.

About one period after thyratron WT is blocked, network 5AN times out permitting thyratron 1AT to conduct to charge the squeeze network SN and render thyratron 2AT non-conducting. Network 10AN then times out, rendering thyratron 3AT conducting to charge network WN. Thyratron 4AT is then rendered nonconducting to permit network 7AN to discharge, but thyratron WT is now maintained nonconducting by the squeeze network SN. The apparatus is now substantially reset for another operation, and such an operation starts at the end of the off interval when network ON has timed out, if switch FS is still closed.

If now the weld thyratron WT should because of a defect continue to conduct when it should become nonconducting, the safety feature provided by thyratron 5AT comes into play. Under such circumstances, the network 2AN times out while thyratron WT is still conducting and thyratron 5AT becomes conducting, transmitting current through the primary OP1. The current flow through the secondary 20S1 maintains the capacitor in network 9AN charged so that thyratron 5AT now continues to conduct independently of network 1AN. In addition, the potential impressed from the secondary 10S1 in the control circuit of thyratron OT maintains the latter conducting independently of the network CTN. The conduction of thyratron OT maintains the network ON charged, and the thyratron ST and STD nonconducting so that that electrode E2 is retracted from the work W. In addition, the network 5AN now has timed out and thyratron 1AT is rendered conducting to charge network SN.

Control potential is now applied to the first control electrodes 175 and 295 of thyratron WT and 2AT. If the defect which originally causes thyratron WT to continue to conduct is in network 7AN or its connections thyratron WT now stops conduction; if it is in thyratron WT the latter continues to conduct. In either event, since thyratron ST is maintained nonconducting, network 1AN is uncharged and potential is impressed on the first control electrode of thyratron 5AT to permit it to continue to conduct and thus to assure that thyratron ST continues to remain nonconducting. Regardless of the position of switch FS then, the apparatus cannot be restarted until thyratron 5AT is permitted to become nonconducting and the necessary repair is made in the apparatus.

*Operation—Nonrepeat*

With the repeat-nonrepeat switch RNR set for nonrepeat, the thyratron STD is controlled only from network STD and once rendered conducting, continues to conduct so long as the start switch SF remains closed. Thyratrons 1AT and CTT then remain nonconducting. Thyratron OT once rendered conducting to charge the network ON, then remains conducting and network ON remains charged. Network ON when charged renders thyratron ST nonconducting, thus preventing the initiation of another operation so long as the foot switch FS remains closed.

But when thyratron WT is rendered conducting during the sequence, thyratron 2AT is also rendered conducting to render thyratron 3AT nonconducting, permitting network WN to time out. This network times out, eventually charging network 6AN and causing thyratron WT to become nonconducting and thus to terminate the weld interval. If thyratron WT should fail to become nonconducting by reason of some defect, network 1AN eventually times out, permitting thyratron 5AT to conduct. This thyratron would continue to conduct and to maintain thyratron OT conducting so long as thyratron ST is nonconducting, and the latter would be maintained nonconducting by the network ON which is charged through the thyratron OT. It would then be necessary to render thyratron 5AT nonconducting and repair the apparatus before another weld could be produced. Thyratron 1AT in this case also provides a positive safety feature.

*Comments on the invention*

It is seen that the essential features of my invention as disclosed in this application relates to a novel circuit for controlling the solenoid SV. The important feature of this circuit is that it is a follow circuit including the thyratrons LT and FT in which the follow effect is produced substantially independently of the load and is not affected by variations in the load or the supply.

While I have shown and described certain specific embodiments of my invention, many modifications thereof are feasible. My invention, therefore, is not to be restricted except insofar as is necessitated by the spirit of the prior art.

I claim as my invention:

1. A follow circuit including a first electric discharge device having an anode and a cathode and including a control electrode, a second electric discharge device having an anode and a cathode and including a control electrode, first biasing means connected to the control electrode of said first device for maintaining said first device nonconducting in the quiescent condition of said circuit, second biasing means connecting to the control electrode of said second device for maintaining said second device nonconducting in the quiescent condition of said circuit, means connecting said anodes and said cathodes of said devices in antiparallel, and means for impressing a potential on the control electrode of said first device to counteract the potential of said first biasing means, said second biasing means including charge storing means and means connecting said charge storing means in a charging circuit between the anode and cathode of said second device, said charging circuit including rectifier means permitting conduction to said charge storing means only when said anode of said second device is electrically negative with respect to said cathode of said second device.

2. A follow circuit including a first electric discharge device having an anode and a cathode and including a control electrode, a second electric discharge device having an anode and a cathode and including a control electrode, first biasing means connected to the control electrode of said first device for maintaining said first device nonconducting in the quiescent condition of said circuit, second biasing means connecting to the control electrode of said second device for maintaining said second device nonconducting in the quiescent condition of said circuit, means connecting said anodes and said cathodes of said devices in antiparallel, and means for impressing a potential on the control electrode of said first device to counteract the potential of said first biasing means, said second biasing means including a capacitor connected between said control electrode and cathode of said second device, a rectifier, and means connecting said capacitor in series with said rectifier between said anode and cathode of said second device with said rectifier poled to conduct positive current from said last-named cathode to said last-named anode.

3. A follow circuit including a first electric discharge device having an anode and a cathode and including a control electrode, a second electric discharge device having an anode and a cathode and including a control electrode, first biasing means connected to the control electrode of said first device for maintaining said first device nonconducting in the quiescent condition of said circuit, second biasing means connecting to the control electrode of said second device for maintaining said second device nonconducting in the quiescent condition of said circuit, means connecting said anodes and said cathodes of said devices in antiparallel, and means for impressing a potential on the control electrode of said first device to counteract the potential of said first biasing means, said second biasing means including a capacitor shunted by resistance means connected between said control electrode and cathode of said second device, the time constant of the network comprising said capacitor and resistance means being such that when charged and permitted to discharge said capacitor discharges sufficiently to permit said second device to conduct in a time interval of the order of one-half period of a commercial alternating current supply, a rectifier, and means connecting said capacitor in series with said rectifier between said anode and cathode of said second device with said rectifier poled to conduct positive current from said last-named cathode to said last-named anode.

4. A follow circuit including a first electric discharge device having an anode and a cathode and including a control electrode, a second electric discharge device having an anode and a cathode and including a control electrode, first biasing means connected to the control electrode of said first device for maintaining said first device nonconducting in the quiescent condition of said circuit, second biasing means connecting to the control electrode of said second device for maintaining said second device nonconducting in the quiescent condition of said circuit, means connecting said anodes and said cathodes of said devices in antiparallel, and means for impressing a potential on the control electrode of said first device to counteract the potential of said first biasing means, said second biasing means including a capacitor shunted by a resistance means connected between said control electrode and cathode of said second device, the time constant of the network comprising said capacitor and resistance means being such that when charged and permitted to discharge said capacitor discharges sufficiently to permit said second device to conduct in a time interval of the order of one-half period of a commercial alternating current supply, a rectifier, means connecting said capacitor in series with said rectifier between said anode and cathode of said second device with said rectifier poled to conduct positive current from said last-named cathode to said last-named anode, and an impedance high compared to the forward impedance of said rectifier and low compared to the back impedance of said rectifier shunting said network and rectifier.

5. Apparatus for supplying a highly reactive load from an alternating current source comprising at least one thyratron having an anode, a cathode and a control electrode, means for connecting said load to said source through said anode and cathode, biasing means connected to said control electrode for maintaining said thyratron non-conducting in the quiescent state of said apparatus, and means to be connected to said control electrode and said source for impressing a potential counteracting said biasing means, the said apparatus being characterized by impressing means which impresses the counteracting potential during substantially a full period of the source.

6. Apparatus for supplying a highly reactive load from an alternating current source comprising at least one thyratron having an anode, a cathode and a control electrode, means for connecting said load to said source through said anode and cathode, biasing means connected to said control electrode for maintaining said thyratron nonconducting in the quiescent state of said apparatus, and means to be connected to said control electrode and said source for impressing a potential counteracting said biasing means, said impressing means including an impedance in circuit with said control electrode and cathode, and a voltage doubling network to be connected between said source and said impedance for impressing a potential counteracting said biasing means between said control electrode and said cathode.

7. Apparatus for supplying a highly reactive load from an alternating current source comprising at least one thyratron having an anode, a cathode and a control electrode, means for connecting said load to said source through said anode and cathode, biasing means connected to said control electrode for maintaining said thyratron nonconducting in the quiescent state of said apparatus, and means to be connected to said control electrode and said source for impressing a potential counteracting said biasing means, said impressing means including an impedance in circuit with said control electrode and cathode, and a voltage doubling network, a transformer having a primary and a secondary, means connecting said secondary to said doubling network, and means to be connected to said source for supplying current to said primary only during alternate half periods of said source.

8. In combination, a first electric discharge device having an anode, a cathode and a control electrode, a second electric discharge device having an anode, a cathode and a control electrode, means connecting said control electrode and cathode of said second device in circuit with said anode and cathode of said first device so that when said first device conducts said second device becomes conducting by reason of the conduction of said first device, said connecting means including biasing means connected to said control electrode of said second device for maintaining said second device nonconducting so long as said first device is nonconducting, the said combination being characterized by that said circuit including said control electrode and cathode of said second device and said anode and cathode of said first device includes means responsive to the open circuit potential across said first device for maintaining said biasing means effective.

References Cited in the file of this patent

UNITED STATES PATENTS

| | | |
|---|---|---|
| 2,359,080 | Bivens | Sept. 26, 1944 |
| 2,361,169 | Bivens | Oct. 24, 1944 |
| 2,361,845 | Hutchins | Oct. 31, 1944 |
| 2,547,228 | Owens | Apr. 3, 1951 |
| 2,600,941 | Undy | June 17, 1952 |
| 2,679,021 | Hartwig | May 18, 1954 |
| 2,786,966 | Taylor | Mar. 26, 1957 |